E. BROWN.
APPARATUS FOR TREATING HEAVY OILS.
APPLICATION FILED APR. 13, 1915.
1,225,569.
Patented May 8, 1917.
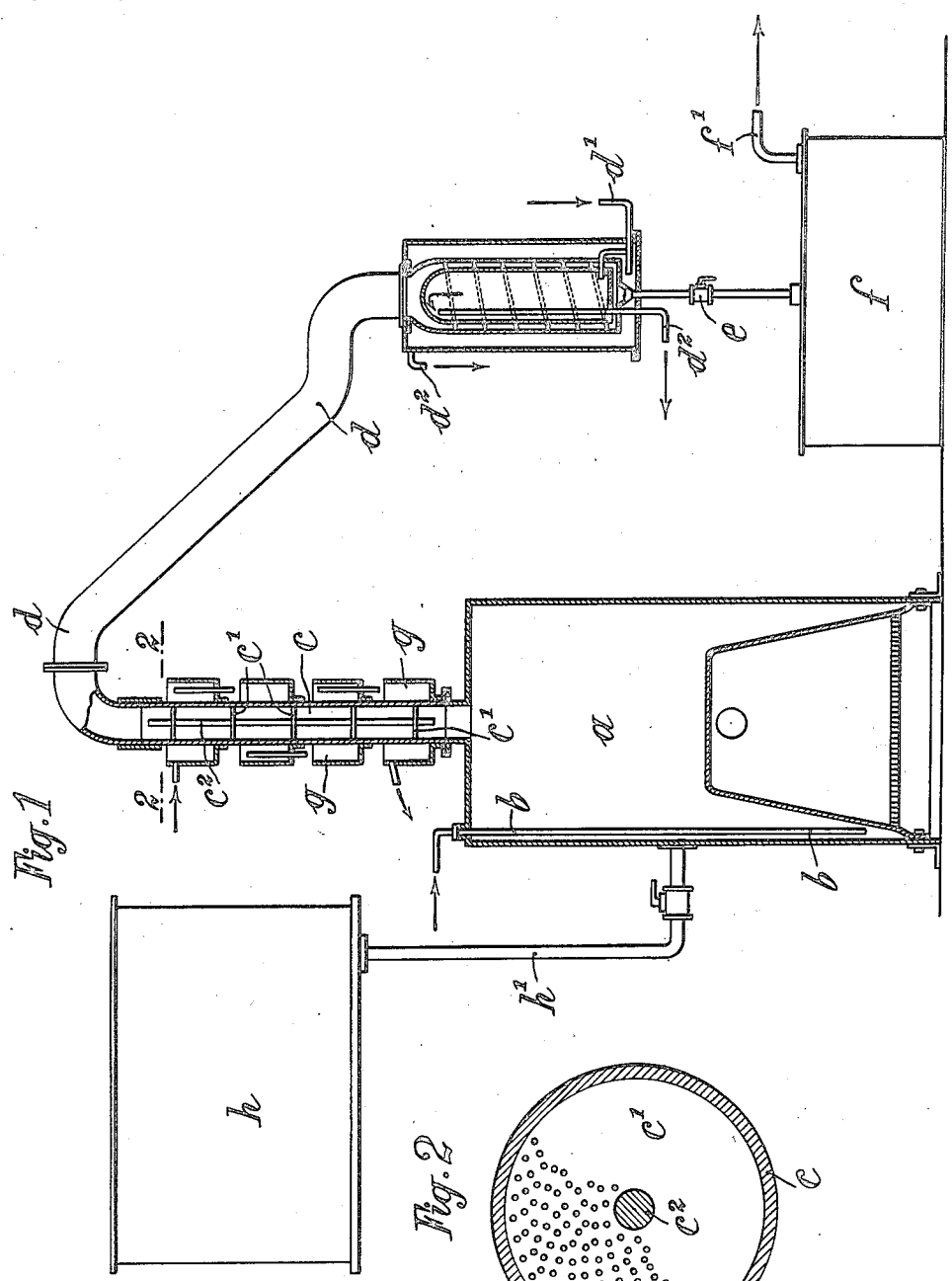

UNITED STATES PATENT OFFICE.

ERNEST BROWN, OF LONDON, ENGLAND, ASSIGNOR TO M. MARIE AMÉDÉE HENRY DE DAMPIERRE, OF PARIS, FRANCE.

APPARATUS FOR TREATING HEAVY OILS.

1,225,569. Specification of Letters Patent. Patented May 8, 1917.

Application filed April 13, 1915. Serial No. 21,081.

*To all whom it may concern:*

Be it known that I, ERNEST BROWN, subject of the King of Great Britain, residing at 25 Charlotte street, Caledonian Road, London, England, have invented certain new and useful Improvements in Apparatus for Treating Heavy Oils, of which the following is a specification.

This invention relates to the treatment of heavy oils such as crude naphtha, lamp oil, paraffin, residuum of the distillation of the naphtha, in order to obtain more volatile oils, suitable for fuel for internal combustion engines.

It has mainly for its object to allow the heavy oils to be treated more rapidly and more economically than hitherto, and to render useful a greater part of the residuum of the distillation of the heavy oils than hitherto.

It consists mainly in an apparatus whereby the vapors of the heavy oils to be treated are caused to circulate while mixed with hydrogen, in contact with large or extensive surfaces of a metal such as nickel having a catalyzing action on the said vapors.

And it may be more easily understood with the aid of the following description and of the accompanying drawing which is however only given by way of example.

Figure 1 shows in vertical section an apparatus for treating heavy oils according to the invention.

Fig. 2 shows in horizontal section through 2—2 Fig. 1 a part of the same apparatus.

For instance, the oil to be treated is of the composition $C_nH_{2n+2}$ and is to be treated in order that a part of this oil be transformed in a more volatile oil having the composition $C_{n/2}H_{2n/2+2}$ obtained by the decomposition of the oil to be treated in a more heavy oil and in a more volatile oil according to the following formula:

$$4C_nH_{2n+2} = 2C_{n/2}H_{2n/2+2} + 2C_{3n/2}H_{6n/2+2}$$

The oil is heated in order to be transformed into vapor, and a current of hydrogen is sent in the vapor thus obtained; the hydrogen combines with the said vapor. The mixture of oil vapor and of hydrogen is then caused to pass into contact with large or extensive surfaces of a metal such as nickel having a catalyzing action; *i. e.* liberating the part of the hydrogen which was combined with the oil vapor and decomposing the said vapor in the vapor of a more volatile oil which is collected in a condenser, and in the vapor of a more heavy oil which condenses immediately.

The said treatment is advantageously made in an apparatus comprising a boiler $a$ in which the oil to be treated is introduced; a pipe $b$ extending into the said boiler and ending near the bottom is used for introducing in the said boiler a current of hydrogen. The vapor produced in the boiler escapes mixed with hydrogen at the top of the boiler through a vertical conduit $c$ in which are mounted nickel plates $c^1$ by means of a central rod $c^2$. The said plates close entirely the conduit $c$, but they are provided with a great number of small holes allowing the vapor to pass. The vapor is thus obliged to come into direct contact with the surface of nickel and thus the catalytic action of the nickel is completely utilized. Advantageously the wall of the conduit $c$ is internally covered with a layer of nickel.

The upper end of the conduit $c$ is connected through a pipe $d$ to a condenser of any suitable kind, for instance to a condenser with a water cooling device in which the water is fed through $d^1$ and escapes through $d^2$; at the lower part of the condenser, a cock $e$ allows the volatile oil condensed in the said condenser to flow in a tank $f$, from the top of which the hydrogen which has been used for the treatment escapes through a pipe $f^1$ and is collected for being used again.

A water cooling device $g$ is preferably mounted around the conduit $c$ in order to maintain the temperature in the said conduit sufficiently low for insuring the total condensation in the said conduit of the vapors of heavy oil produced by the decomposition of the oil treated; consequently the heavy oil thus condensed returns in the boiler $a$ and vapors of the said heavy oil cannot be drawn by the vapors of volatile oil in the condenser.

The apparatus is advantageously completed by a tank containing the oil to be treated; this tank $h$ is connected to the boiler through a pipe $h^1$ provided with a cock allowing the boiler to be fed as the volatile oil is produced.

Obviously the invention is not limited to those methods of carrying out, which have been described, but comprises on the contrary, any modification within the scope of the claim.

Having now particularly described and ascertained the nature of my said invention and in what manner the same may be performed, I declare that what I claim is:

Apparatus for treating heavy oils, comprising a boiler for vaporizing the oil to be treated, a pipe extending into the boiler for introducing a current of hydrogen into the lower portion thereof, a conduit through which the vapor passes from the boiler, nickel plates extending transversely of and closing said conduit, said plates having numerous holes therethrough for the passage of the vapor, and a pipe for connecting the outlet end of said conduit to a condenser.

In testimony whereof I have hereunto set my hand in presence of two subscribing witnesses.

ERNEST BROWN.

Witnesses:
 H. D. JAMESON,
 WILLIAM FREEMAN.